(12) United States Patent
Joodaki

(10) Patent No.: US 7,786,621 B2
(45) Date of Patent: Aug. 31, 2010

(54) CIRCUIT ARRANGEMENT AND METHOD FOR REDUCING ELECTROMAGNETIC INTERFERENCE

(75) Inventor: Mojtaba Joodaki, Dresden (DE)

(73) Assignee: Qimonda AG, Munich (DE)

( * ) Notice: Subject to any disclaimer, the term of this patent is extended or adjusted under 35 U.S.C. 154(b) by 905 days.

(21) Appl. No.: 11/550,933

(22) Filed: Oct. 19, 2006

(65) Prior Publication Data
US 2007/0117434 A1 May 24, 2007

(30) Foreign Application Priority Data
Oct. 19, 2005 (DE) .................. 10 2005 050 147

(51) Int. Cl.
*H04B 3/30* (2006.01)
(52) U.S. Cl. .................................... 307/91
(58) Field of Classification Search .......... 307/91; 333/235; 343/802; 361/818
See application file for complete search history.

(56) References Cited
U.S. PATENT DOCUMENTS
5,872,807 A 2/1999 Booth et al.
6,020,939 A * 2/2000 Rindal et al. ............. 348/805
6,201,706 B1 * 3/2001 Gustavsen et al. ......... 361/753
7,026,545 B2 * 4/2006 Barr et al. ................. 174/33

FOREIGN PATENT DOCUMENTS
EP 1 248 394 A2 10/2002

OTHER PUBLICATIONS
Hall et al., "High-Speed Digital System Design," A Handbook of Interconnect Theory and Design Practices, John Wiley & Sons, Inc., 2000, pp. 273-275 (Spread Spectrum Clocking).

* cited by examiner

*Primary Examiner*—Albert W Paladini
(74) *Attorney, Agent, or Firm*—Dickstein, Shapiro, LLP.

(57) ABSTRACT

Circuit arrangement and method for reducing electromagnetic interference. The circuit arrangement includes a supply potential connection, a reference-ground potential connection, a controllable impedance element, a signal generator, and a circuit unit. The controllable impedance element is connected between the supply potential connection and the reference-ground potential connection, and has a control connection for receiving a control signal for controlling the impedance of the impedance element. The signal generator is coupled to the control connection of the impedance element. The circuit unit is connected between the supply potential connection and the reference-ground potential connection, and originates the electromagnetic interference during operation. The signal generator is designed to produce the control signal, which varies over time, in such a manner that the electromagnetic interference which originates from the circuit unit during operation is changed.

20 Claims, 4 Drawing Sheets

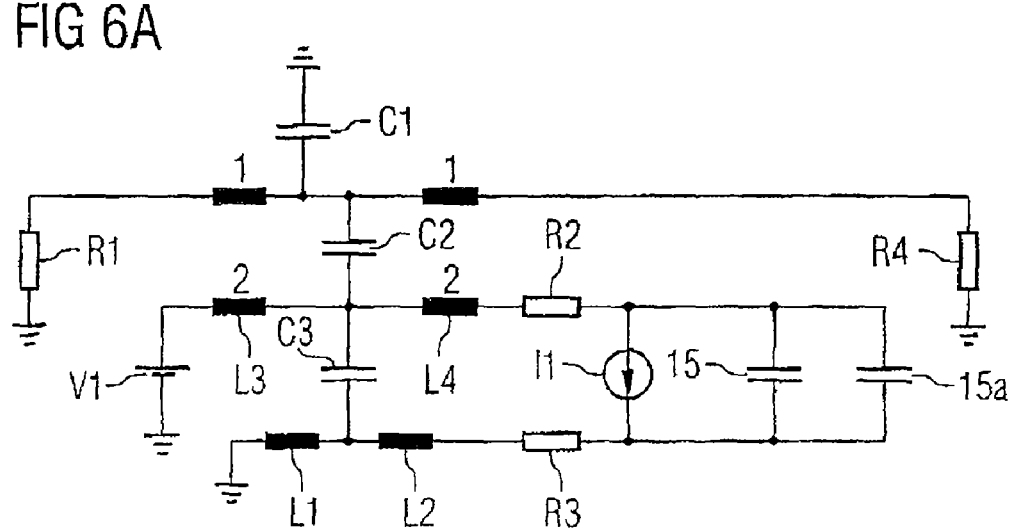
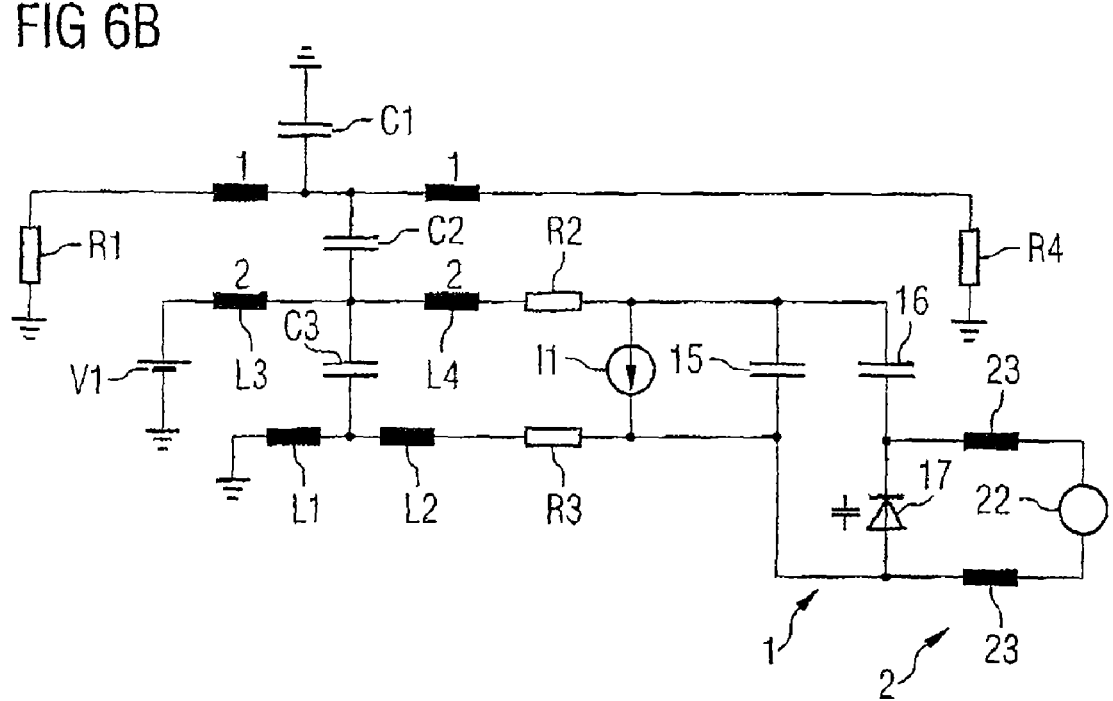

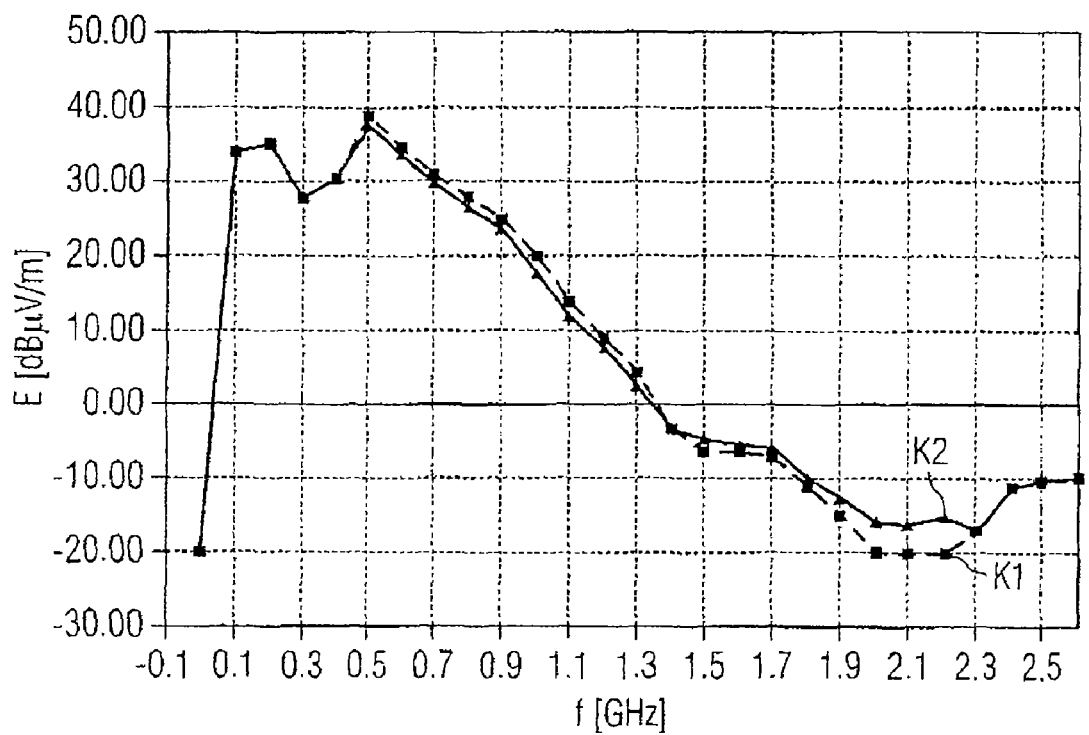

US 7,786,621 B2

CIRCUIT ARRANGEMENT AND METHOD FOR REDUCING ELECTROMAGNETIC INTERFERENCE

CROSS-REFERENCE TO RELATED APPLICATION

This application claims priority to German Patent Application Serial No. 102005050147.8, which was filed Oct. 19, 2005, and is incorporated herein by reference in its entirety.

FIELD OF THE INVENTION

The present invention relates to a circuit arrangement and to a method for reducing electromagnetic interference.

BACKGROUND TO THE INVENTION

Many circuits are nowadays operated using radio-frequency signals, in particular in the field of digital technology. The circuits may in this case be in the form of integrated circuits, circuits of modular design or circuits in a discrete form, for example on printed circuit boards. In addition to the desired function of a circuit, the radio-frequency signals often also result in undesirable effects. This includes the outputting of radio-frequency signals which are created in the circuit and are inadvertently emitted to the surrounding area. This effect is referred to as electromagnetic interference (EMI). In particular, the expression electromagnetic interference is used when the emission of electromagnetic fields results in a negative influence on the operation of this particular circuit, or of other circuits. This can even lead to destruction of a circuit.

The measure of how specifically a circuit can be influenced electromagnetically is defined by the electromagnetic compatibility (EMC). The EMI level should in this case be below specific EMC limit values for the circuit, as a function of the frequency. As a function of the frequency in this case means that compliance with the limit values is checked by analysis of the frequency spectrum of the emitted signal. The EMI of a circuit should thus be reduced to such an extent that it is below the respective limit value at every frequency. When reducing the EMI, it is therefore also possible to speak of reducing the magnitude of an emitted signal in one portion of the frequency spectrum.

Possible methods for this purpose are shielding, in which the emission of the electromagnetic fields is attenuated, or deliberately designing a circuit in such a manner that the components are arranged in such a way that the emitted electromagnetic fields are as weak as possible. However, it is not always possible to take this into account in the design of a circuit.

High-speed digital circuits are particularly susceptible to EMI problems. In order to reduce the EMI in these circuits, it is possible to use a method which is referred to as "spread spectrum clocking". In this method, the frequency of the system clock for a circuit is slowly modulated, so that the frequencies of the emitted electromagnetic fields also vary. Slow variation of the frequency of the system clock likewise results in a slow variation of the frequency of the peaks in the frequency spectrum of the emitted electromagnetic field which is created during operation of the circuit. Averaged over time, the peaks in the frequency spectrum are thus distributed over a wider frequency range, and the amplitude of the peaks is decreased overall. This can be referred to as smearing of the spectral energy. The manner of the distribution over a wider frequency range depends on the way in which the frequency of the system clock is varied. In some circumstances, however, it is possible for a situation to occur in which influencing the system clock also results in an offset in the time control, which can have a disadvantageous effect on other parts of a digital system. In particular, it is possible to disadvantageously influence the operation of phase locked loops, PLLs.

It may therefore be desirable to provide a circuit arrangement and a method for reducing electromagnetic interference, while at the same time maintaining a system clock at a stable frequency.

SUMMARY OF THE INVENTION

A circuit arrangement for reducing electromagnetic interference, the arrangement including a supply potential connection, a reference-ground potential connection, a controllable impedance element, a signal generator, and a circuit unit. The controllable impedance element is connected between the supply potential connection and the reference-ground potential connection, and has a control connection for receiving a control signal for controlling the impedance of the impedance element. The signal generator is coupled to the control connection of the impedance element. The circuit unit is connected between the supply potential connection and the reference-ground potential connection, and originates the electromagnetic interference during operation. The signal generator is designed to produce the control signal, which varies over time, in such a manner that the electromagnetic interference which originates from the circuit unit during operation is changed.

A method for reducing electromagnetic interference which originates from a circuit unit which is connected to supply connections. The method includes coupling the supply connections to one another via an impedance element which has a controllable value, and driving the impedance element with a control signal which varies over time, in order to vary the impedance of the impedance element over time in such a manner that a time profile of the electromagnetic interference which originates from the circuit unit is changed.

BRIEF DESCRIPTION OF THE FIGURES

The invention will be explained in detail in the following text using exemplary embodiments and with reference to the drawings, in which:

FIG. 6A shows a simulation model of a microcontroller without use of the invention;

FIG. 6B shows a simulation model of a microcontroller when the invention is in use; and FIG. 7 shows a second exemplary frequency spectrum of the electromagnetic interference with and without the use of the invention.

DETAILED DESCRIPTION OF THE INVENTION

Figure 1:
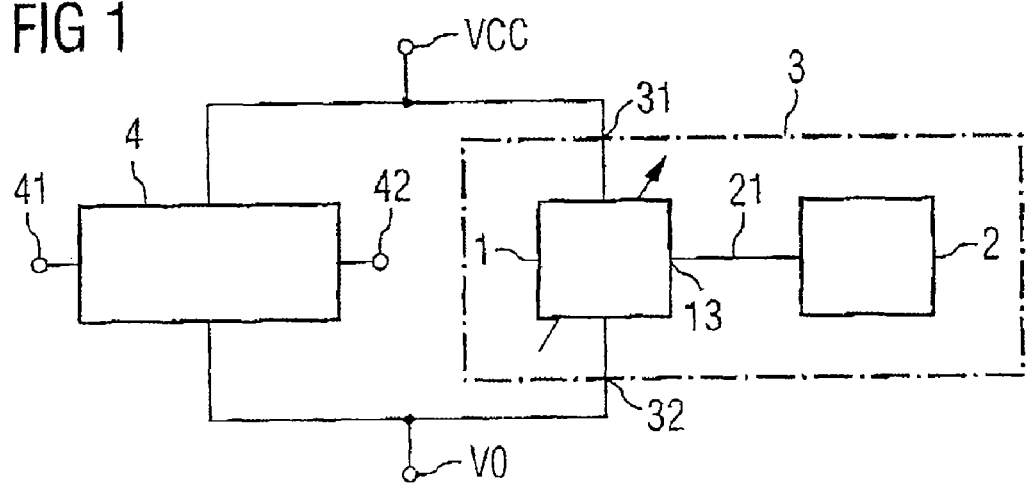
FIG. 1 shows one exemplary embodiment of a circuit arrangement according to the invention.

In one exemplary embodiment, an arrangement is provided which has a supply potential connection, a reference-ground potential connection, a controllable impedance element with a control connection, a circuit unit and a signal generator. During operation, electromagnetic interference originates from the circuit unit. The impedance of the impedance element can be varied by supplying a control signal to the control connection. The signal generator is coupled to the control connection of the impedance element. Furthermore, the impedance and the circuit unit are connected between the supply potential connection and the reference-ground potential connection. The signal generator is designed to produce the control signal which varies over time, in such a manner that the electromagnetic interference which originates from the circuit unit during operation is changed.

Since the impedance element is connected to the circuit unit via the supply potential connection and the reference-ground potential connection, the electrical behavior of the circuit unit changes during operation. If the impedance of the impedance element is now varied over time by means of the control signal from the signal generator, this results in the electrical behavior of the circuit unit also varying over time. In particular, this can affect electromagnetic fields which are emitted as electromagnetic interference. This therefore leads to a change in the electromagnetic interference by distribution of the emitted energy over a broader frequency range. If the control signal has a suitable signal form and the impedance of the impedance element is thus changed over time in a suitable form, the electromagnetic interference from the circuit unit is reduced. Since the reduction in the electromagnetic interference is achieved only via the impedance, this does not adversely affect the frequency stability of the system clock.

In another embodiment, the impedance has a component with a non-linear electrical behavior. The non-linear electrical behavior comprises, inter alia, the impedance of the impedance element being varied, but not in direct proportion to the change in the control signal. A different aspect of the non-linearity relates to the frequency response. If, by way of example, a signal at a constant frequency is applied to a component with a non-linear behavior, this can also result in the creation of a signal with harmonics of this frequency, that is to say frequency components in the signal at twice, three times, etc. the frequency. This can lead to the magnitude of an electromagnetic field being reduced in the circuit unit, by energy being shifted to electromagnetic fields at a higher frequency. This makes it possible, for example, to comply better with a limit value for electromagnetic interference at relatively low frequencies.

In a further embodiment, the impedance element has a component with a controllable capacitive behavior. The capacitive behavior results in the component being distinguished in particular by its impedance being a function of frequency. This allows the time-dependent and frequency-dependent electrical behavior of the circuit unit to be influenced well.

In a further refinement, the impedance element has a varactor. A varactor is a semiconductor component with controllable capacitive characteristics. Embodiments for a varactor are, for example, a varactor diode or an MOS varactor. The varactor diode is a diode with a pronounced capacitive behavior. This is normally operated in the reverse direction, with the capacitance value being non-linearly dependent on the applied reverse voltage. An MOS varactor is a field-effect transistor in which the capacitive behavior between the gate and the substrate is made use of for a specific purpose. The capacitance value can be varied via the applied gate voltage, and is likewise non-linearly dependent on it. The control signal must be supplied to these components as a reverse voltage or gate voltage.

In one alternative embodiment, the impedance element has a Schottky diode. In this case, it is possible, in particular, to make use of the non-linear behavior of a Schottky diode.

In a further embodiment, the signal generator is designed to produce the control signal in periodic form. The profile of the change in the impedance of the impedance element is thus repeated continually. In one embodiment, the signal generator is designed to produce the control signal as a triangular-waveform signal. This signal form results in the change in the impedance being made use of in an advantageous manner, with regard to its frequency response.

In a further embodiment, the signal generator is designed to produce the control signal in such a manner that the frequency of the control signal is lower than an operating frequency for which the circuit unit is designed. In order to prevent the frequency of the control signal from being able to influence the operation of the circuit unit, it is necessary, for example, to prevent the frequency of the control signal from being injected into the circuit unit. This can be achieved relatively easily in the case of frequencies which are lower than the operating frequency of the connected circuit unit.

In one embodiment, the circuit unit is designed for digital signal processing. The circuit unit also has an input for supplying an input signal, and an output for tapping off an output signal, which is derived from the input signal by digital processing. Particularly in the case of circuits with digital signal processing, for example in microprocessors, problems with the emission of radio-frequency electromagnetic fields, frequently occur because of the signal form of the processed signals. Square-wave signals, in particular, have a frequency spectrum which contains components at frequencies which are considerably higher than the actual clock frequency. These often cause the emission of electromagnetic fields, that is to say the electromagnetic interference. In this case as well, the electromagnetic interference can be reduced considerably by varying the impedance of the impedance element over time.

In one embodiment of a method for reducing electromagnetic interference which originates from a circuit unit which is connected to supply connections, the supply connections are coupled to one another via an impedance element which has a controllable value. The impedance element is driven with a control signal, which varies over time, in order to vary the impedance of the impedance element over time, in such a manner that the time profile of the electromagnetic interference which originates from the circuit unit is changed.

The electrical behavior of the circuit unit is influenced by coupling the supply connections of the circuit unit via the impedance element. Driving the impedance element with a control signal which is varied over time also changes the electrical behavior of the circuit unit over time as a result of the variation of the impedance of the impedance element. According to the invention, this leads to a reduction in the electromagnetic interference which originates from the circuit unit during operation.

In a further embodiment of the method, the impedance element has a non-linear electrical behavior. In the same way, the impedance element can have a capacitive behavior.

In one alternative refinement, the impedance element has a varactor. In this case, a varactor also represents a semiconductor component with a controllable capacitive behavior. In one alternative embodiment of the method, the impedance element has a Schottky diode.

The impedance element is advantageously driven by a control signal in periodic form, in the method. The impedance can likewise be driven by a triangular-waveform signal as the control signal. In one embodiment of the method, the frequency of the control signal is intended to be lower than an operating frequency of the circuit unit.

FIG. 1 shows an exemplary embodiment according to the invention of the circuit arrangement with a circuit unit 4 and an impedance block 3. The impedance block 3 has an impedance element 1 for providing the controllable value, as well as a signal generator 2 which is coupled via a control line 21 to the control connection 13 of the impedance element. The supply potential connection 31 of the impedance block 3 is connected to a supply potential VCC, and the reference-ground potential connection 32 of the impedance block 3 is connected to a reference-ground potential V0. The circuit unit 4 is also connected to the supply potential VCC and to the reference-ground potential V0. The circuit unit 4 also has a signal input 41 and a signal output 42. A signal which is tapped off at the signal output 42 after being processed by the circuit unit 4 is supplied to the circuit unit 4 via the signal input 41. The signals at the signal input 41 and the signal output 42 may be in analog or digital form. The circuit unit 4 is, for example, in the form of a microprocessor.

The impedance of the impedance element 1 is varied over time by means of a control signal from the signal generator 2 on the control line 21. As a result of the coupling of the impedance element 1 to the circuit unit 4 via the supply potential connection 31 and the reference-ground potential connection 32, the electrical behavior of the circuit unit 4 is also influenced when the value of the impedance of the impedance element 1 is changed. However, on the other hand, if signals with radio-frequency components occur between the connections for the supply potential VCC and the reference-ground potential V0 as a result of the operation of the circuit unit 4, then this radio-frequency signal also passes through the impedance element 1. If the impedance element 1 is appropriately driven, the radio-frequency signal is influenced in such a way that the amplitude in the frequency spectrum of the signals which are induced for emission is distributed over a broader frequency range, because the impedance is varied over time. In this case, it is also possible to speak of a frequency peak of the electromagnetic interference being spread. The maximum value of the amplitudes which occur in the frequency spectrum falls. Overall, this leads to a reduction in the electromagnetic interference.

Figure 2:
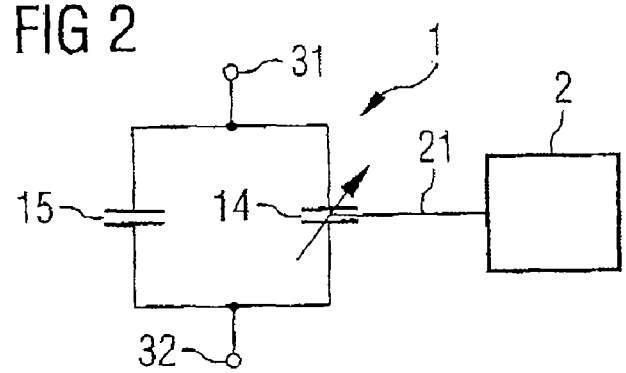
FIG. 2 shows a first exemplary embodiment of the impedance element with a signal generator.

FIG. 2 shows an exemplary embodiment of the impedance element with a controllable value and a connected signal generator. Components having the same function and/or effect are in this case provided with the same reference symbols. The impedance element 1 in this case comprises the parallel circuit formed by a capacitor 15 with a capacitor 14, whose capacitance value is variable, with a control connection which is connected to the signal generator 2 via the control line 21. The impedance of the impedance element 1 results from the sum of the impedance value of the fixed capacitor 15 and of the impedance value of the variable capacitor 14. This predetermines a specific value range for the impedance of the impedance element 1. Connected to a circuit unit 4 (which is not shown here) according to the exemplary embodiment in FIG. 1, the variable impedance element 1, whose value is varied by the signal generator 2, produces its affect by spreading of the spectrum of the electromagnetic interference.

Figure 3:
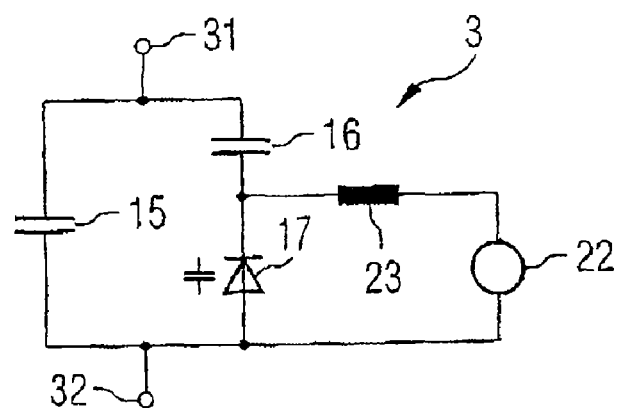
FIG. 3 shows a second exemplary embodiment of the impedance element with a signal generator.

A further-developed embodiment of the variable impedance element with a connected signal generator is shown in FIG. 3. The impedance block 3 is formed from the parallel circuit comprising the capacitor 15 with the capacitor 16 and varactor diode 17 connected in series. In this case, the diode is operated in the reverse direction, that is to say the anode connection of the diode 17 is connected to the reference-ground potential connection 32, and the cathode connection is connected to the capacitor 16. Furthermore, the impedance block 3 has a signal source 22, which is coupled on the one hand to the reference-ground potential connection 32 and on the other hand via a coil 23 to the cathode connection of the diode 17. The reverse voltage across the varactor diode 17 is varied by the instantaneous voltage value of the signal source 22 whose frequency, for example, is low. In the case of a varactor diode, this leads to a change in its capacitance value. Since the voltage of the signal source 22 represents an alternating signal, which is also coupled to the varactor diode 17 via a coil 23. This results in reduced power losses in the coil 23 than in the case of the conventional coupling via a non-reactive resistance. In general, the capacitor 16 has a very high capacitance value, and is used primarily to isolate the low-frequency voltage of the signal source 22 from the radio-frequency signal which is expected between the supply potential connection 31 and the reference-ground potential connection 32. Since the capacitance value of the capacitor 16 is also considerably higher than any value which can be achieved by the varactor diode 17, it can in practice be ignored in the calculation of the capacitance value of the parallel circuit. The frequency components of the voltage from the signal source 22 should be in a lower frequency range than the expected induced signals of the electromagnetic interference since, otherwise, the capacitor 16 could no longer carry out its described isolating function. The signal form of the signal source 22 may in principle be designed as required, but it is advantageous to choose a triangular-waveform signal or a sawtooth-waveform signal.

Figure 4:
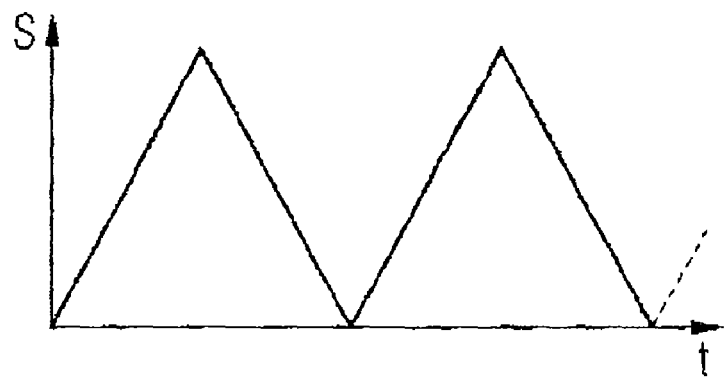
FIG. 4 shows a signal/time diagram for a control signal from a signal generator.

FIG. 4 shows one example of the time profile of a control signal from the signal generator, at 2. In this case, the signal value S is indicated against time t. The time profile of the signal has a triangular or sawtooth waveform, and has a periodic profile. Since the triangular-waveform signal or sawtooth-waveform signal is composed of a plurality of frequency components, this has been found to be more suitable for this application than, for example, a sinusoidal oscillation, which comprises only one frequency component. The periodic signal profile results in the change in the value of the impedance over time being carried out continually, thus permanently leading to spreading of peaks in the frequency range of the electromagnetic interference.

Figure 5A:
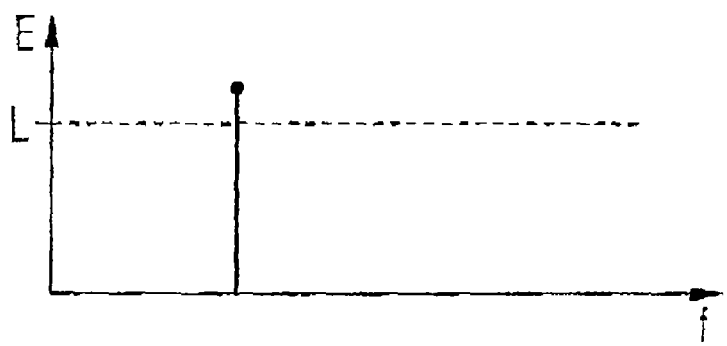
FIG. 5A shows a first exemplary frequency spectrum of the electromagnetic interference without use of the invention.
Figure 5B:
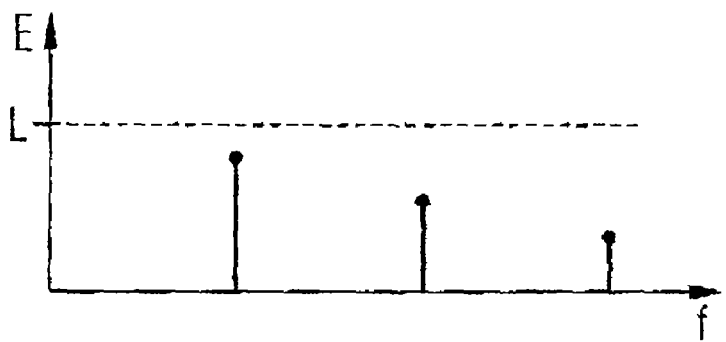
FIG. 5B shows a first exemplary frequency spectrum of the electromagnetic interference when the invention is in use.

FIGS. 5A and 5B show an exemplary frequency spectrum of the electromagnetic interference without and with the use of the invention. FIG. 5A in this case shows a single high peak of the electromagnetic interference at one specific frequency, without use of the invention. The peak value is in this case above a predetermined limit value L. When the circuit arrangement according to the invention is used, a plurality of lower peaks of the electromagnetic interference are found in FIG. 5B, distributed over a plurality of frequencies. All of the frequency components are now below the predetermined limit value L. By way of example, the higher frequency components are harmonics of the lowest frequency. This results, for example, from the use of non-linear components, such as a varactor diode, in the impedance element 1 whose value is controllable.

FIGS. 6A and 6B show models for a microcontroller for evaluation of electromagnetic interference that occurs, without and with the use of the principle according to the invention. The microcontroller is in this case simulated by an equivalent circuit with the resistors R1 to R4, the coils L1 to L4 and capacitors C1 to C3 and 15. The equivalent circuit of the microcontroller is supplied from the voltage source V1. Electromagnetic interference which originates from the microcontroller is represented by a pulse source I1 in the equivalent circuit.

In FIG. 6A, the capacitance value of the capacitor 15 is increased by the parallel-connected capacitor 15a. This does not result in any change in the electromagnetic interference in the equivalent circuit.

In FIG. 6B, a controllable impedance element 1 based on the principle according to the invention and in the form of a varactor diode with a connected signal generator 2, which is designed to emit a triangular-waveform signal, is connected in parallel with the capacitor 15. The varactor diode is designed such that, when the voltage of the triangular-waveform signal is equal to 0 volts, its capacitance value is equal to the capacitance value of the capacitor 15a in the circuit shown in FIG. 6A.

The results of the simulation with the equivalent circuits shown in FIGS. 6A and 6B are illustrated in FIG. 7 in the form of the emitted frequency spectra of the electromagnetic interference. In this case, the characteristic K1 with the dashed line and the square symbols represents the profile of the frequency spectrum for the equivalent circuit shown in FIG. 6A without the principle according to the invention being used, and the characteristic K2 with the solid line and the triangular symbols represents the profile of the frequency spectrum for the equivalent circuit shown in FIG. 6B, in which the principle according to the invention is used. As can be seen, the levels of the electromagnetic interference in the frequency range from 0.6 to 1.3 GHz are reduced by the use of the impedance element 1, while there is a slight increase in the levels of the electromagnetic interference in the frequency range from 1.5 to 2.5 GHz, specifically as a result of the distribution of the levels from a lower frequency range to a higher frequency range. This is therefore referred to as a reduction in the electromagnetic interference, since the levels of an emitted signal are reduced in one portion of the frequency spectrum.

What is claimed is:

1. A circuit arrangement for reducing electromagnetic interference, comprising:
   a supply potential connection;
   a reference-ground potential connection;
   a controllable impedance element, which is connected between the supply potential connection and the reference-ground potential connection and has a control connection for receiving a control signal for controlling the impedance of the impedance element;
   a signal generator, which is coupled to the control connection of the impedance element; and
   a circuit unit, which is connected between the supply potential connection and the reference-ground potential connection and from which the electromagnetic interference originates during operation,
   wherein the signal generator is designed to produce the control signal, which varies over time, thereby spreading an amplitude in the frequency spectrum of the electromagnetic interference which originates from the circuit unit during operation.

2. The circuit arrangement as claimed in claim 1, wherein the impedance element has a component with a non-linear electrical behavior.

3. The circuit arrangement as claimed in claim 1, wherein the impedance element has a component with a controllable capacitive behavior.

4. The circuit arrangement as claimed in claim 1, wherein the impedance element has a varactor.

5. The circuit arrangement as claimed in claim 1, wherein the impedance element has a Schottky diode.

6. The circuit arrangement as claimed in claim 1, wherein the signal generator is designed to produce the control signal in periodic form.

7. The circuit arrangement as claimed in claim 1, wherein the signal generator is designed to produce the control signal as a triangular-waveform signal.

8. The circuit arrangement as claimed in claim 1, wherein the signal generator is designed to produce the control signal in such a manner that a frequency of the control signal is lower than an operating frequency for which the circuit unit is designed.

9. The circuit arrangement as claimed in claim 1, wherein the circuit unit is designed for digital signal processing and has an input for supplying an input signal, and an output for tapping off an output signal, which is derived from the input signal by digital processing.

10. A method for reducing electromagnetic interference which originates from a circuit unit which is connected to supply connections, comprising:
    coupling the supply connections to one another via an impedance element which has a controllable value; and
    driving the impedance element with a control signal which varies over time, in order to vary the impedance of the impedance element over time, thereby changing a time profile and spreading an amplitude in the frequency spectrum of the electromagnetic interference which originates from the circuit unit.

11. The method as claimed in claim 10, wherein the impedance element has a non-linear electrical behavior.

12. The method as claimed in claim 10, wherein the impedance element has a capacitive behavior.

13. The method as claimed in claim 10, wherein the impedance element has a varactor.

14. The method as claimed in claim 10, wherein the impedance element has a Schottky diode.

15. The method as claimed in claim 10, wherein the impedance element is driven by the control signal in periodic form.

16. The method as claimed in claim 10, wherein the impedance element is driven by a triangular-waveform signal as the control signal.

17. The method as claimed in claim 10, wherein a frequency of the control signal is lower than an operating frequency of the circuit unit.

18. A circuit arrangement for reducing electromagnetic interference, comprising:
    a controllable impedance means, which is connected between supply connections and has a control connection, for supplying a control signal for controlling the impedance of the impedance element;
    a signal generator, which is coupled to the control connection of the impedance element; and
    a circuit unit, which is connected between the supply connections and from which the electromagnetic interference originates during operation,
    wherein the signal generator is designed to produce the control signal, which varies over time, thereby spreading an amplitude in the frequency spectrum of the electromagnetic interference which originates from the circuit unit during operation.

19. A circuit arrangement for reducing electromagnetic interference which originates from a circuit unit connected to supply connections, comprising:
   means for coupling the supply connections to one another via an impedance element which has a controllable value; and
   means for driving the impedance element with a control signal which varies over time, in order to vary the impedance of the impedance element over time, thereby changing a time profile and spreading an amplitude in the frequency spectrum of the electromagnetic interference which originates from the circuit unit.

20. A circuit arrangement for reducing electromagnetic interference, comprising:
   a circuit unit, which is connected between a supply potential connection and a reference-ground potential connection, and from which the electromagnetic interference originates during operation; and
   an impedance block, which is connected between the supply potential connection and the reference-ground potential connection, having a varying impedance thereby spreading an amplitude in the frequency spectrum of the electromagnetic interference which originates from the circuit unit during operation.

* * * * *